US009011669B2

(12) United States Patent
James (10) Patent No.: US 9,011,669 B2
(45) Date of Patent: Apr. 21, 2015

(54) APPARATUS AND METHOD FOR ELECTROCHEMICAL MODIFICATION OF LIQUIDS

(71) Applicant: Patrick I. James, Madison, WI (US)

(72) Inventor: Patrick I. James, Madison, WI (US)

(73) Assignee: Blue Planet Strategies, L.L.C., Madison, WI (US)

(*) Notice: Subject to any disclaimer, the term of this patent is extended or adjusted under 35 U.S.C. 154(b) by 255 days.

(21) Appl. No.: 13/621,349

(22) Filed: Sep. 17, 2012

(65) Prior Publication Data

US 2014/0076740 A1  Mar. 20, 2014

(51) Int. Cl.
*C02F 1/461* (2006.01)
*C02F 1/469* (2006.01)
*C02F 101/20* (2006.01)

(52) U.S. Cl.
CPC ............ *C02F 1/461* (2013.01); *C02F 1/46104* (2013.01); *C02F 1/4693* (2013.01); *C02F 2101/20* (2013.01); *C02F 2201/4611* (2013.01); *C02F 2201/46115* (2013.01); *C02F 2201/46185* (2013.01)

(58) Field of Classification Search
CPC ... B01D 61/46; C02F 1/4693; C02F 1/46104; C02F 1/46114
USPC ................... 204/252; 205/348, 554, 748, 749
See application file for complete search history.

(56) References Cited

U.S. PATENT DOCUMENTS

| 4,206,020 A | * | 6/1980 | Backhurst et al. ............ 205/348 |
| 4,282,082 A | | 8/1981 | Cook et al. |
| 4,627,899 A | | 12/1986 | Smith et al. |
| 5,593,554 A | * | 1/1997 | Yamanaka et al. ............ 204/252 |
| 6,176,997 B1 | | 1/2001 | Shelp et al. |
| 6,451,089 B1 | | 9/2002 | Marsden et al. |
| 6,663,689 B2 | | 12/2003 | Marsden et al. |
| 6,972,107 B2 | | 12/2005 | Marsden et al. |
| 7,041,152 B2 | | 5/2006 | Marsden et al. |
| 7,125,436 B2 | | 10/2006 | Marsden et al. |
| 7,341,700 B2 | | 3/2008 | Marsden et al. |
| 7,462,272 B2 | | 12/2008 | Marsden et al. |
| 7,473,413 B2 | | 1/2009 | Marsden et al. |

(Continued)

FOREIGN PATENT DOCUMENTS

WO  WO 2011128376 A1 * 10/2011

OTHER PUBLICATIONS

National Institute of Environmenal Health Services. "Research Brief 186: DEMET—Converting Waste into a Resource." Superfund Research Program. Jun. 2, 2010.*

*Primary Examiner* — Keith Hendricks
*Assistant Examiner* — Steven A. Friday
(74) *Attorney, Agent, or Firm* — Miodrag Cekic; Intellectual Property Strategists, LLC.

(57) ABSTRACT

An apparatus for electrochemical modification of liquid streams employing an electrolytic cell which includes an anode compartment defined by an anode structure where oxidation is effected, containing a liquid electrolyte anolyte, and a cathode compartment defined by a cathode structure where reduction is effected containing a liquid electrolyte catholyte. In addition, the electrolytic cell includes at least one additional compartment arranged at least partially between the anode compartment and the cathode compartment and separated from the anode compartment and the cathode compartment by a separator structure arranged to supports ionic conduction of current between the anode structure and the cathode structure.

21 Claims, 3 Drawing Sheets

(56) References Cited

U.S. PATENT DOCUMENTS

| | | |
|---|---|---|
| 7,476,308 B2 | 1/2009 | Marsden et al. |
| 7,485,216 B2 | 2/2009 | Marsden et al. |
| 7,517,384 B2 | 4/2009 | Marsden et al. |
| 7,591,934 B2 | 9/2009 | Marsden et al. |
| 7,666,371 B2 | 2/2010 | Marsden et al. |
| 7,736,475 B2 | 6/2010 | Sandoval et al. |
| 8,012,318 B2 | 9/2011 | Marsden et al. |
| 8,016,983 B2 | 9/2011 | Stevens et al. |
| 2001/0013471 A1* | 8/2001 | Hartel et al. ............ 204/522 |
| 2010/0084280 A1* | 4/2010 | Gilliam et al. ............ 205/555 |

* cited by examiner

APPARATUS AND METHOD FOR ELECTROCHEMICAL MODIFICATION OF LIQUIDS

GOVERNMENT LICENSE RIGHTS

This invention was made and reduced to practice in parts with U.S. government support under National Institutes of Health (NIH) Small Business Innovation Research (SBIR) grant 1 R43 ES20096-01 AND Department of Energy (DOE) Small Business Innovation Research (SBIR) grant DE-SC0006181. The U.S. government has certain rights in the invention.

CROSS REFERENCE TO RELATED APPLICATIONS

This application is related to U.S. patent applications: Ser. No. 13/020,447 entitled "A METHOD FOR ELECTROCHEMICAL MODIFICATION OF LIQUID STREAMS filed with the U.S. Patent and Trademark Office on Feb. 03, 2011; U.S. patent applications Ser. No. 11/623,658 (resulting in the issued U.S. Pat. No. 7,967,967) entitled "APPARATUS AND METHOD FOR ELECTROCHEMICAL MODIFICATION OF LIQUID STREAMS" filed with the U.S. Patent and Trademark Office on Jan. 16, 2007; U.S. patent applications Ser. No. 13/117,769 entitled "APPARATUS AND METHOD OF ELECTROCHEMICAL MODIFICATION OF CONCENTRATIONS OF LIQUID STREAMS" filed with the U.S. Patent and Trademark Office or May 27 , 2011; and U.S. patent applications Ser. No. 13/251,646 entitled "APPARATUS FOR RLECTROOHEMICAL MODTFICATION OF LIQUID STREAM" filed with the U.S Patent and Trademark Office on Oct. 03, 2011; all of which are incorporated herein by reference.

FIELD OF THE INVENTION

The invention relates to an apparatus and a method for electrochemical modification of concentrations of constituents of liquid streams which contain organic and/or inorganic components. More precisely, the invention is concerned with an electrolytic cell technology with potentials to modification of concentrations of the components.

BACKGROUND OF THE INVENTION

Contamination of liquid streams with various organic and inorganic constituents may represent an environmental problem affecting environment quality and represents significant threat to human health and safety. For example, heavy metals contaminations of aquatic environments may arise from commercial mining and metal extraction processes, surfaces modification and protection processes, or communal and industrial waste sites resulting from a variety of active or defunct industrial fabrication and manufacturing activities. Similarly, significant organic water pollutants, like aliphatic, aromatic, or halogenated hydrocarbons and phenols may be associated with oil exploration, extraction and refining, chemicals production, or large-scale farming and food processing.

In addition to potentials for significant environmental damage, affected liquid streams my represent dilute sources of desirable raw materials like heavy metals, metal oxides, inorganic salts, and other compounds. For example, the Berkeley Mine Pit in Butte, Mont. alone represents an estimated 30 billion gallons of acid mine drainage which contains ~180 ppm of copper along with other metals and thus could yield up to 22,000 tons of pure copper by use of a small treatment facility.

An economically relevant group of prior art methods of removal of heavy metal ions from liquid solutions is based on chemical precipitation. This process is likely burdened by complexity, high cost, clear preference for extremely large facilities and high-volume operations, and efficiency decrease with decrease in concentration of pollutants. Additional disadvantages may concern resulting byproduct of precipitated sludge which may become a concentrated yet mixed contaminant source of the toxins in the source material. The sludge may mandate further processing and costly long term disposal as a highly toxic waste. Many similar disadvantages may burden alternative heavy ion removal methods that may incorporate: filtration, ion exchange, foam generation and separation, reverse osmosis, or combinations of listed processes.

In contrast, the extraction technologies enabled by several aspects of the current invention may be adapted to alleviate at least some of the above considerations. Additional features of the current invention, for example, may contribute to the feasibility of modifying prior art electrowinning technology so that it can be used to economically concentrate copper generated in low-grade process streams instead of simply removing it. In general, the disclosed embodiments of the copper extraction technology may prepare a process stream so the customer can produce new copper from currently inaccessible sources with existing in-place processing infrastructure, equipment, and processes.

The present invention may provide some innovative features for unlocking this vast and vitally needed resource. Typical mines contain significant amounts of their copper in such unviable ores. This invention may allow the use of this "waste" ore and thereby increase average heap leach mine output by 25% and thus globally yield 3 Billion lbs/yr of newly recoverable copper.

Furthermore, additional features of embodiments of the current invention may allow for practical metal recovery from: Acid Rock Drainage (ARD), heavy metal and radionuclide contaminated sites, and metal contaminated industrial effluents such as electrowinning, plating plant, pickling operations, and circuit board manufacture (etching) discharges.

In addition, different embodiments of the current invention may be applicable pertinent to commercial and municipal processes where potential contaminants may be reprocessed in parallel or in immediate sequence with processes that may generate such materials to start with. Even further, methods and apparatus of the current invention may achieve the above functions in an essentially integrated manner, frequently using at least one common treatment loop to simultaneously refine the desired products, generate materials and compounds that may be reused in the subsequent performances of the process by the disclosed apparatus, and generate essentially non-polluting byproducts.

Finally, by application of highly integrated multifunctional devices and processes, the components of the current invention may achieve desirable results utilizing optimized quantities of components, raw materials, ingredients, and required energy; thus approaching optimized economic results.

SUMMARY OF THE INVENTION

A method and an apparatus for electrochemical modification of liquid streams employing an electrolytic cell which utilize an anode compartment defined by an anode structure where oxidation is effected, containing a liquid electrolyte anolyte, and a cathode compartment defined by a cathode structure where reduction is effected containing a liquid electrolyte catholyte. In addition at least one additional compartment has been arranged at least partially between the anode compartment and the cathode compartment and separated from the anode compartment and the cathode compartment by a separator structure arranged to support ionic conduction of current between the anode structure and the cathode structure. Also, a system for conducting unidirectional electric current provides a unidirectional current flow supported by the liquid electrolytes from the anode structure through the separator structure and into the catholyte and to the cathode structure have been provided.

The separator structure incorporates at least one ion conductive membrane positioned to contactly separate the anode compartment and the at least one additional compartment, and arranged to conduct a plurality of Hydrogen-like Cations while impeding transport of at least one selection of Anions, and at least another selective ion conductive membrane positioned to contactly separate the cathode compartment and the at least one additional compartment, and arranged to conduct at least another selection of Anions while impeding transport of the plurality of Hydrogen-like Cations.

BRIEF DESCRIPTION OF THE DRAWINGS

The above and other embodiments, features, and aspects of the present invention are considered in more detail in relation to the following description of embodiments shown in the accompanying drawings, in which.

DETAILED DESCRIPTION OF THE INVENTION

The invention summarized above may be better understood by referring to the following description, which should be read in conjunction with the accompanying drawings. This description of an embodiment, set out below to enable one to build and use an implementation of the invention, is not intended to limit the invention, but to serve as a particular example thereof. Those skilled in the art should appreciate that they may readily use the conception and specific embodiments disclosed as a basis for modifying or designing other methods and systems for carrying out the same purposes of the present invention. Those skilled in the art should also realize that such equivalent assemblies do not depart from the spirit and scope of the invention in its broadest form. Similar to the inventions in the applications incorporated by reference above (first paragraph), embodiments of this instant invention can be of planar, circular, and concentric tubular or other configurations containing two or more separate electrolyte compartments as required to address different application needs.

Figure 1:
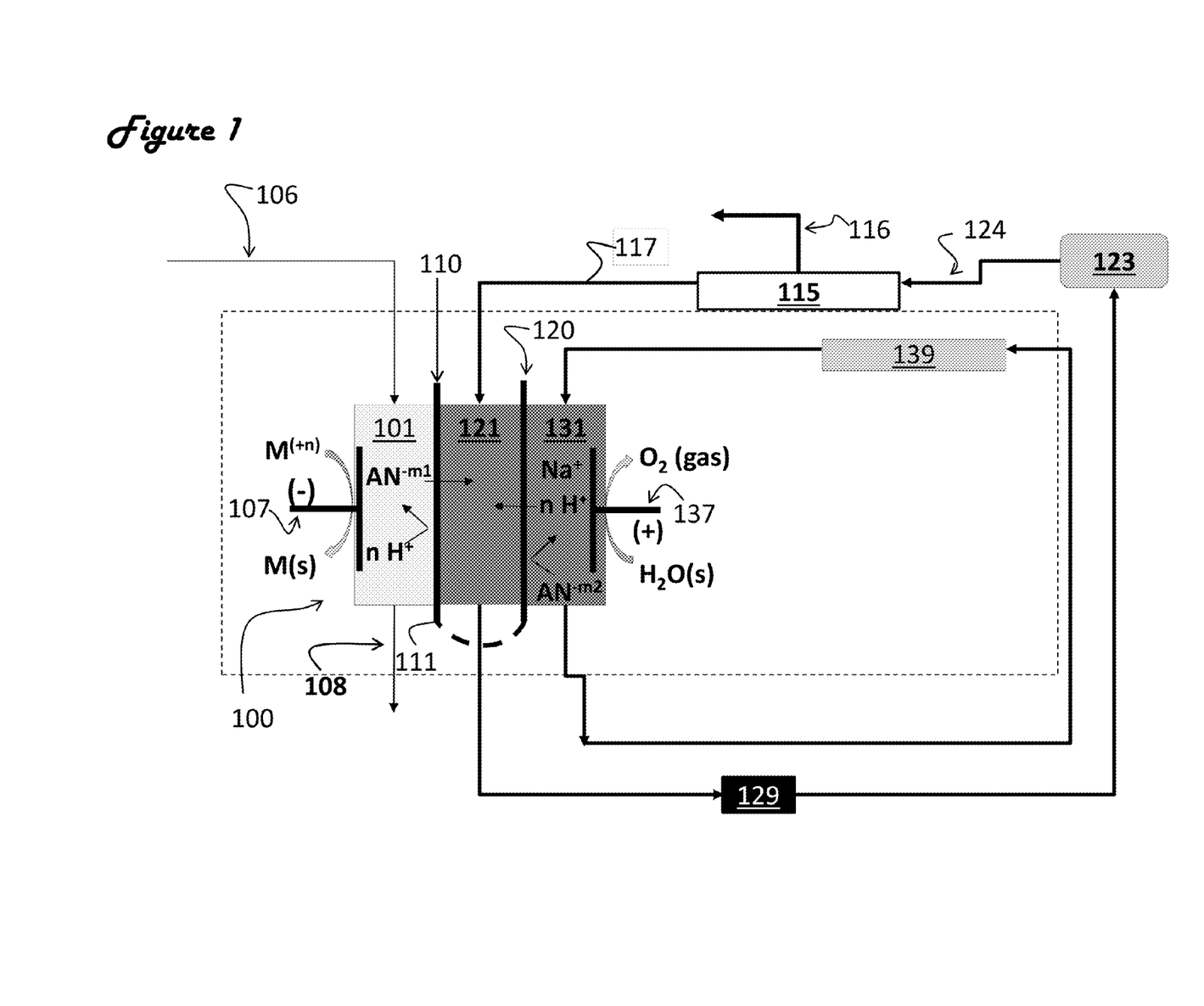
FIG. 1. is a schematic view of devices and processes of some embodiments in accordance with the current invention.

One embodiment of the instant invention is illustrated in FIG. 1. It may be noted by the practitioner of the related arts that this embodiment (as illustrated in FIG. 1) may be compared to embodiments of the inventions cited and incorporated (in its entirety) by reference in the section entitled "CROSS REFERENCE TO RELATED APPLICATIONS".

In specific embodiments of the current invention, in addition to the features of the above applications incorporated by reference, at least one additional compartment 121 may be added nominally between (at least partially) the cathode and anode compartments 101 and 131 respectively, and separated by at least one separator structure 111 arranged to prevent bulk mixing of the contents of the separated compartments 101, 121, and 131. In some embodiments, the separator structure 111 may include a pair of ion conductive elements arranged to allow transport of desired ion species between the compartments 101, 121, and 131. In one group of embodiments the separator structure 111 my incorporate ion conductive membranes 110 and 120 in direct contact with the contents of the compartments 101 and 121, and compartments 121 and 131 (i.e. contactly separating compartments 101, 121, and 131). The ion conductive membranes may incorporate ion conductive channels such that specific ions may be transported between compartments with fluxes depending on specific embodiment parameters including applied voltage, ion concentrations, temperature, ion mobility, and dimensions and surface properties of channels etc. The parameters may be arranged such that desired Anions are preferably transported from the cathode compartment 101 into the at least one additional compartment 121, while desired Cations may be preferably transported from the anode compartment 131 into the at least one additional compartment 121.

A particular combination of the electrical fields for the cell operation in conjunction with the selective nature of the separating membranes may allow one to separate and transfer into the at least one additional compartment 121 ions of interest so that they may be concentrated in the added compartment in the manner comparable to electrodialysis. One feature of such modified cell may be to gain practical utility for several industrially important applications.

In the FIG. 1 schematically illustrated example, at least one electrolytic cell 100 having at least three compartments with at least two separate electrolyte flows separated by at least two ion conductive membranes 110 and 120 respectively. The at least one cathode compartment 101 input 106 may depend on the specific circumstances of the application and may include any number of liquid (aqueous and nonaqueous) streams containing dilute metals of suitable redox activity. As in the above-incorporated applications, a cathode structure 107 may be conventional (stationary) assembly or may, in different embodiments, incorporate a moving bed of conductive particulates for which numerous compositions (as incorporated above) may be appropriate.

Several metals indicative for some aqueous solutions of interest as the input 106, may include (but not be limited by): copper, iron, nickel, cobalt, cadmium, zinc, indium, gold, platinum, palladium, silver, mercury, tin, and rhenium. Other metals "M(s)" or metal Cations "$M^{(+n)}$" or metal containing ion complexes could be addressed in applications where one of the goals my be to reduce the metal's oxidation state (e.g. from +n to +(n−1), +(n−2), . . . ), and not necessarily to plate the metal out. The solutions' pH may be in the range from strongly acidic to strongly alkaline.

In particular embodiments, the input 106 may include Acid Rock Drainage (ARD) containing, for example, high sulfate acidic solutions including mixtures of dilute metals, as a result of natural processes attacking exposed sulfide containing rock (ore). The cathode compartment output 108 then may have the concentrations of the target metal ion lowered (this may allow for transformation of the species from one oxidation state to another without actual removal of the target metal ion from solution) and the sulfate concentration lowered.

Depending upon different embodiments, at least one anode structure 137 of at least one anode compartment 131 may either utilize a conventional geometrically stabile DSA electrode or may incorporate moving beds of particulates, for example, using particulates transferred to/from the cathode compartment 101, as disclosed in the incorporated application Ser. No. 13/117,789.

At least one additional compartment 121 may be arranged at least partially between the at least one anode compartment 131 and the at least one cathode compartment 101, and separated from the anode compartment and the cathode compartment by the separator structure 111, incorporating at least two ion conductive membranes 110 and 120, arranged to support ionic conduction of current between the anode structure 137 and the cathode structure 107, but to restrict transport of selected Anions $AN^{-m2}$ from the anode compartment 131 into the at least one additional compartment 121, and to restrict transport of Cations ($nH^+$) from the at least one cathode compartment 101 into the at least one additional compartment 131.

In some embodiments, the at least one ion conductive membrane 110 may represent a selective ion conductive membrane positioned to contactly separate the at least one cathode compartment 101 and at least one additional compartment 121 (while being in direct contact with the liquids contained in the compartments 101 and 121) and arranged to selectively conduct specific Anions $AN^{-m1}$ or a composition of Anions as appropriate to the specific embodiments, while impeding transport of Hydrogen $H^+$ or Hydrogen-like (e.g. "Haydronium", "Zundel", or "Eigen") Cations. In contrast, the at least one ion conductive membrane 120 may represent a selective ion conductive membrane positioned to contactly separate the at least one anode compartment 131 and at least one additional compartment 121 (while being in direct contact with the liquids contained in the compartments 131 and 121) and arranged to conduct Hydrogen $H^+$ or Hydrogen-like Cations while restricting transport of the $AN^{-m2}$ or a composition of Anions as appropriate to the specific embodiments. As a result, operations of the cell 100 may result, inter alia, in gradual increase of concentrations of $AN^{-m1}$ and $H^+$ ions (and therefore the $H_{m1}AN$ acid) in the at least one additional compartment 121. Therefore, outputs 129 from the compartment 121, having elevated acidity, may be used for other purposes as the particular groups of embodiments may mandate or desire.

One embodiment may include processing of zinc—where the particulate bed may be transferred into the anolyte but not in electrical contact with the anode structure 137. The anode structure may utilize a separate DSA electrode for oxygen evolution (for example) from water splitting ($H_2O \rightarrow 4H^+ + O_2 + e-$) and the zinc being spontaneously stripped from the particulate electrode [using an inert substrate like 316 SS] to generate concentrated $ZnSO_4$ in the anolyte). The water splitting on the anode includes generation of protons which may subsequently be separated from the background supporting electrolyte (salt) via the proton selective Cation conductive membrane 120. Membranes selective to other Cations could be used (for the appropriate embodiments).

It may be noted that the supporting electrolyte 139 may include a number of common salts or mixtures thereof. Different embodiments may include (but not be limited to) all combinations of CA Cations where CA=$H^+$, $Na^+$, $K^+$, $Li^+$, and $NH_4^+$, and AN Anions where AN=Acetate, bromide, chloride, Chlorate, cyanide, hydroxide, hypochlorite, iodate, iodide, nitrate, oxalate, perchlorate, phosphate, and sulfate plus those shown in the following Table I.

TABLE I

Common Ion Chart

| Positive Ions (Cations) | | Negative Ions (Anions) | |
|---|---|---|---|
| Aluminum | $Al^{+3}$ | Acetate | $C_2H_2O_2^-/CH_3COO^-$ |
| Ammonium | $NH_4^+$ | Bromide | $Br^-$ |
| Barium | $Ba^{+2}$ | Carbonate | $CO_3^{-2}$ |
| Cadmium | $Cd^{+2}$ | Hydrogen Carbonate Ion/ Bicarbonate | $HCO_3^-$ |
| Calcium | $Ca^{+2}$ | Chlorate | $ClO_3^-$ |
| Chromium (II) | $Cr^{+2}$ | Chloride | $Cl^-$ |
| Chromium (III) | $Cr^{+3}$ | Chlorite | $ClO_2^-$ |
| Cobalt (II) | $Co^{+2}$ | Chromate | $CrO_4^{-2}$ |
| Copper (I) | $Cu^+$ | Cyanide | $CN^-$ |
| Copper (II) | $Cu^{+2}$ | Dichromate | $Cr_2O_7^{-2}$ |
| Hydrogen | $H^+$ | Fluoride | $F^-$ |
| Hydronium | $H_3O^+$ | Hydride | $H^-$ |
| Iron (II) | $Fe^{+2}$ | Hydroxide | $OH^-$ |
| Iron (III) | $Fe^{+3}$ | Hypochlorite | $ClO^-$ |
| Lead (II) | $Pb^{+2}$ | Iodate | $IO_3^-$ |
| Lead (IV) | $Pb^{+4}$ | Iodide | $I^-$ |
| Lithium | $Li^+$ | Nitrate | $NO_3^-$ |
| Magnesium | $Mg^{+2}$ | Nitride | $N^{-3}$ |
| Manganese (II) | $Mn^{+2}$ | Nitrite | $NO_2^-$ |
| Mercury (I) | $Hg_2^{+2}$ | Oxalate | $C_2O_4^{-2}$ |
| Mercury (II) | $Hg^{+2}$ | Oxide | $O^{-2}$ |
| Potassium | $K^+$ | Hydrogen Oxalate Ion | $HC_2O_4^-$ |
| Silver | $Ag^+$ | Perchlorate | $ClO_4^-$ |
| Strontium | $Sr^{+2}$ | Permanganate | $MnO_4^-$ |
| Sodium | $Na^+$ | Peroxide Ion | $O_2^{-2}$ |
| Tin (II) | $Sn^{+2}$ | Phosphate | $PO_4^{-3}$ |
| Tin (IV) | $Sn^{+4}$ | Monohydrogen Phosphate | $HPO_4^{-2}$ |
| Zinc | $Zn^{+2}$ | Dihydrogen Phosphate | $H_2PO_4^-$ |
| | | Silicate | $SiO_3^{-2}$ |
| | | Sulfate | $SO_4^{-2}$ |
| | | Hydrogen Sulfate Ion/ Bisulfate | $HSO_4^-$ |
| | | Thiosulfate | $S_2O_3^{-2}$ |
| | | Sulfide | $S^{-2}$ |
| | | Hydrogen Sulfide Ion/ Bisulfide | $HS^-$ |
| | | Sulfite | $SO_3^{-2}$ |
| | | Hydrogen Sulfite Ion/ Bisulfite | $HSO_3^-$ |

1—mono
2—di
3—tri
4—tetra
5—penta
6—hexa
7—hepta
8—octa
9—nona
10—deca

As in the discussion of the above embodiments, the at least one additional compartment 121 may be delineated on either side by selective ion conductive membranes 110 and 120 which allow selective ionic conduction. In some embodiments, a simple physical barrier such as a microporous membrane like DARAMIC® available commercially at least from the Daramic, LLC (a business unit of Polypore, Inc. with headquarters in Charlotte, N.C. USA) could also be used but typically achieves lower separation efficiency and resultant concentration differentials than afforded by ion selective membranes. Typically an Anion selective membrane may be employed to separate the cathode compartment 101 and the additional compartment 121. In such an embodiment, a sulfate selective Anion conductive membrane may be used (several available, for example, from Veolia Water Solutions & Technologies). Many commercial varieties of Anion selective membranes are also available in alternative, and would be suitable for use herein and in different embodiments. For the anode compartment 131/additional compartment 121 separation, a Cation selective membrane 120 may be used. In some embodiments, a proton selective membrane like DuPont's Nafion® (or NAFION®) may be used, with Nafion® 325 being a possible choice due to its enhanced suppression of back diffusion of Anions. Again, many other commercial examples of Cation and proton selective Cation selective membranes exist and may be suitable for use herein and in other embodiments. The emerging polymer membrane based fuel cell industry represent a market of choice and a motivator for the future R&D and may be a rich source of new and better membranes for emerging and yet to emerge embodiments of the current invention.

In the embodiments pertinent to the schematics illustrated in FIG. 1, the outputs 129 may be used in an extraction procedure wherein, a strong leachant solution including the output 129 (having e.g. sulfuric acid) may be passed through raw materials 123 (e.g. crushed ore) to leach out target metal or metals from the raw materials 123. The resultant leachate 124 (pregnant leach solution or PLS) may be subsequently processed in a reactor 115 to remove the dissolved metals. Most of the target metals 116 may be removed, but a residual amount of target metal remains in a weak solution called raffinate 117. It may be noted that the leaching procedures may consumes the leachant (again as acid contained in the output 129) and fresh makeup leachant (here acid) may need to be added to the residual raffinate before it is recycled back to leach more raw materials 123.

It may be noted that in some embodiments, the reactor 115 may be based on electrochemical principles and incorporate electrolytic cells as recited above and/or in the above-incorporated applications.

Figure 2:
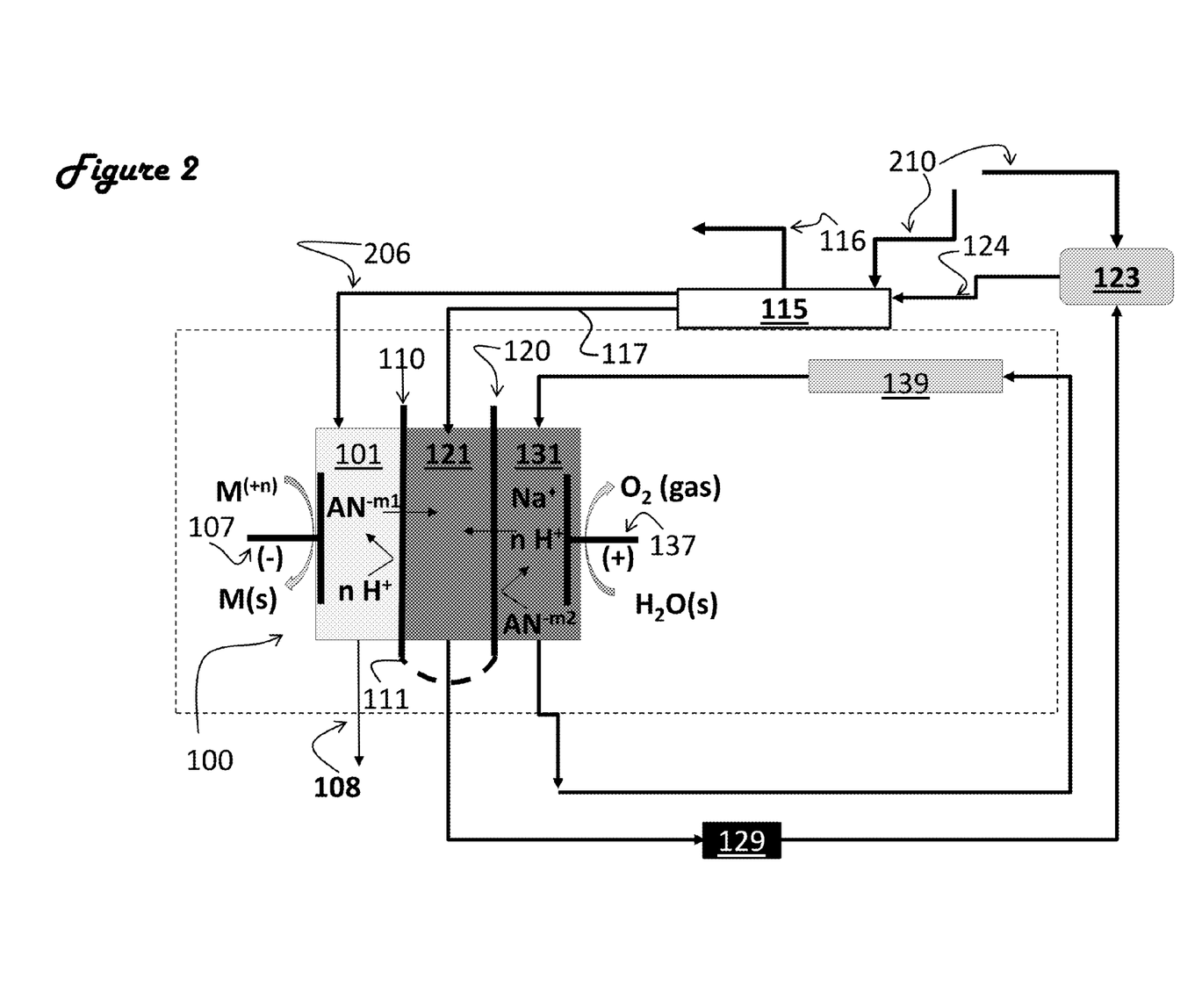
FIG. 2. is a schematic view of devices and processes of different embodiments in accordance with the current invention.

Regarding embodiments of the current invention pertinent to the schematic illustration in FIG. 2, where it may not be desirable to directly input solutions of interest as the input 106 into the cathode compartment 101, a portion of the raffinate 206 exiting the reactor 115 may be inputted into the at least one cathode compartment 101. The remaining portion of the raffinate 117 may, as before (e.g. FIG. 1), be directed into the at least one additional compartment 121 for recycling and further concentration of the acid ingredients. It may be noted that the residual metal in the raffinate 117 may not be lost for extraction and is likely to be reacquired (e.g. plated as metal) during the subsequent passages through the reactor 115 and/or the cathode compartment 101.

Furthermore, one may note that FIG. 2-*illustrated* embodiments may include addition of further external components 210 intended to improve devices and operations acting, for example, as supporting solvents (aqueous or non-aqueous), detergents, lubricants, emulgators, coagulats, surfactants, buffers, corrosion inhibitors, and/or combinations of the above functions.

Figure 3:
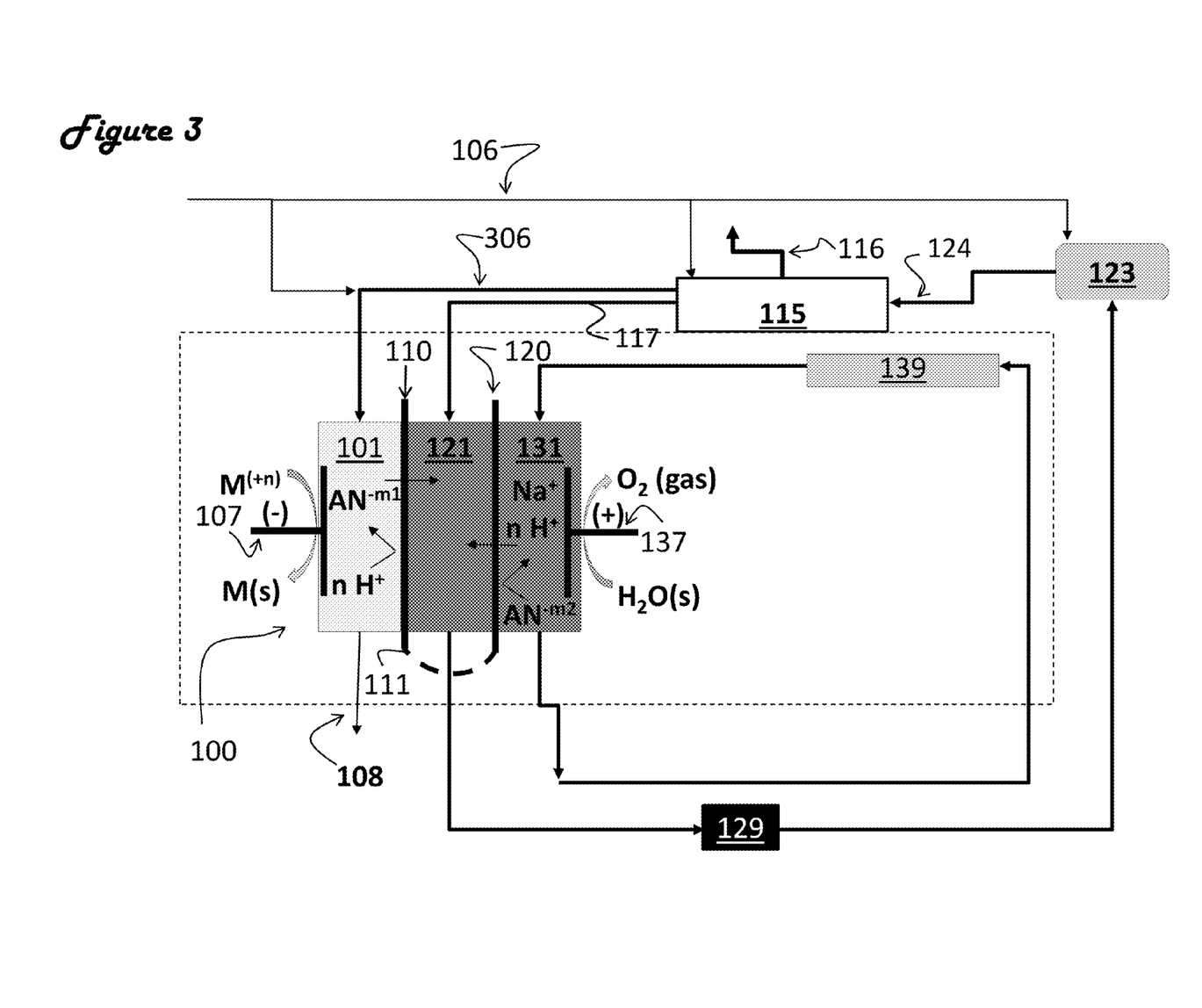
FIG. 3. is a schematic view of devices and processes of other different embodiments in accordance with the current invention.

Regarding embodiments of the current invention pertinent to the schematic illustration in FIG. 3, where it may not be sufficient amount (or flaw) of the input 106 (e.g. ADR), the input 106 may vary in time (seasonally or in response to meteorological conditions), or/and may be suboptimal to introduce only the input 106 directly into the at least one cathode compartment 101, the input 106 may be in-mixed with the portion 306 of the raffinate, in-mixed directly into the reactor 115, and/or co-applied to the raw materials 123. It may be noted that, as discussed above regarding the FIG. 2, the metal content in the input 106 exiting through the portion 117 of the raffinate may not be lost for extraction and is likely to be reacquired (e.g. plated as metal) during the subsequent passages through the reactor 115 and/or the cathode compartment 101.

Processes of controlled removal of products of electrochemical reactions can be performed continuously during the operation of the electrolytic cell as customary in the art of electrochemical disinfection or pollution removal, or using batch process as customary in art of conventional electrowinning of metals. Both modes of operation are in accordance with the present invention.

The present invention has been described with references to the exemplary embodiments arranged for different applications. While specific values, relationships, materials and components have been set forth for purposes of describing concepts of the invention, it will be appreciated by persons skilled in the art that numerous variations and/or modifications may be made to the invention as shown in the specific embodiments without departing from the spirit or scope of the basic concepts and operating principles of the invention as broadly described. It should be recognized that, in the light of the above teachings, those skilled in the art can modify those specifics without departing from the invention taught herein. Having now fully set forth the preferred embodiments and certain modifications of the concept underlying the present invention, various other embodiments as well as certain variations and modifications of the embodiments herein shown and described will obviously occur to those skilled in the art upon becoming familiar with such underlying concept. It is intended to include all such modifications, alternatives and other embodiments insofar as they come within the scope of the appended claims or equivalents thereof. It should be understood, therefore, that the invention may be practiced otherwise than as specifically set forth herein. Consequently, the present embodiments are to be considered in all respects as illustrative and not restrictive.

I claim:

1. An apparatus for electrochemical modification of liquid streams employing at least one electrolytic cell which comprises:
    an anode compartment defined by an anode structure where oxidation is effected, containing a liquid electrolyte anolyte;
    a cathode compartment defined by a cathode structure where reduction is effected containing a liquid electrolyte catholyte;
    at least one additional compartment arranged at least partially between the anode compartment and the cathode compartment and separated from the anode compartment and the cathode compartment by a separator structure arranged to support ionic conduction of current between the anode structure and the cathode structure;
    a particulate manipulation system arranged to manipulate particulate motion such that after participating in at least one target redox reactions, the anode and the cathode particles are separated from the respective anolyte and catholyte flows, and controllably passed to the cathode compartment and the anode compartment respectively; and
    a system for conducting unidirectional electric current supported by the electrolytes from the anode structure through the separator structure and into the catholyte and to the cathode structure;
    wherein, the separator structure incorporates at least one ion conductive membrane positioned to contactly separate the anode compartment and the at least one additional compartment, and is arranged to preferentially conduct a plurality of Hydrogen Cations while impeding transport of at least one selection of Anions, and at least another ion conductive membrane positioned to contactly separate the cathode compartment and the at least one additional compartment, and arranged to preferentially conduct at least another selection of Anions while impeding transport of the plurality of Hydrogen Cations.

2. The apparatus of claim 1 wherein, the cathode structure comprises conducting cathode particulates forming a cathode particulates bed and a current feeder device in at least intermittent contact with said cathode particulates where the cathode particulates are arranged in motion and the particulates motion is substantially independent of a bulk flow of the catholyte.

3. The apparatus of claim 2 wherein, the anode structure comprises conducting anode particulates forming an anode particulates bed and a current feeder device in at least intermittent contact with said anode particulates where the anode particulates are arranged in motion and the particulates motion is substantially independent of a bulk flow of the anolyte.

4. The apparatus of claim 1, wherein the at least one ion conductive membrane positioned to contactly separate the anode compartment and the at least one additional compartment incorporates a selective ion conductive membrane.

5. The apparatus bf claim 4, wherein the at least one selective ion conductive membrane positioned to contactly separate the anode compartment and the at least roe additional compartment incorporates a proton selective Cation conductive membrane.

6. The apparatus of claim 1, wherein the at least another ion conductive membrane positioned to cbntactly separate the cathode compartment and the at least one additional compartment incorporates a selective ion conductive membrane.

7. The apparatus of claim 6, wherein the at least another selective ion conductive membrane positioned to contactly separate the cathode compartment and the at least one additional compartment incorporates a sulfate selective Anion conductive membrane.

8. The apparatus of claim 1, wherein the liquid electrolyte catholyte comprises Cations selected from the group consisting of $Al^{+3}$, $NH_4^+$, $Ba^{+2}$, $Cd^{+2}$, $Ca^{+2}$, $Cr^{+2}$, $Cr^{+3}$, $Co^{+2}$, $Cu^+$, $Cu^{+2}$, $H^+$, $H_3O^{+2}$, $Fe^{+2}$, $Fe^{+3}$, $Pb^{+2}$, $Pb^{+4}$, $Li^+$, $Mg^{+2}$, $Mn^{+2}$, $Hg_2^{+2}$, $Hg^{+2}$, $K^+$, $Ag^+$, $SR^{+2}$, $Na^+$, $Sn^{+2}$, $Sn^{+4}$, $Zn^{+2}$, and mixtures thereof.

9. The apparatus of claim 1, wherein the liquid electrolyte anolyte comprise Anions selected from the group consisting of $C_2H_3O_2^-/CH_3COO^-$, $Br^-$, $CO_3^{-2}$, $HCO_3^-$, $ClO_3^-$, $Cl^-$, $CrO_4^{-2}$, $CN^-$, $Cr_2O^{-2}$, $F^-$, $H^-$, $OH^-$, $ClO^-$, $IO_3^-$, $I^-$, $NO_3^-$, $N^{-3}$, $NO_2^-$, $C_2O_4^{-2}$, $O^{-2}$, $HC_2O_4^-$, $O_2^{-2}$, $PO_4^{-3}$, $HPO_4^{-2}$, $H_2PO_4^-$, $SiO_3^{-2}$, $SO_4^{-2}$, $HSO_4^-$, $S_2O_3^{-2}$, $S^{-2}$, $HS^-$, $SO_3^{-2}$, $HSO_3^-$, and mixtures thereof.

10. The apparatus of claim 1, wherein an input into the anode compartment includes an Acid Rock Drainage.

11. The apparatus of claim 1, wherein an input into the anode compartment includes a mixture of an Acid Pock Drainage and a raffinate.

12. A method for electrochemical modification of liquid streams employing at least one electrolytic cell which comprises:

(a) providing the at least one electrolytic cell incorporating an anode compartment defined by an anode structure where oxidation is effected, containing a liquid electrolyte anolyte;

a cathode compartment defined by a cathode structure where reduction is effected containing a liquid electrolyte catholyte;

at least one additional compartment arranged at least partially between the anode compartment and the cathode compartment and separated from the anode compartment and the cathode compartment by a separator structure arranged to support ionic conduction of current between the anode: structure and the cathode structure;

a particulate manipulation system arranged to manipulate particulate motion such that after participating in at least one target redox reactions, the anode and the cathode particles are separated from the respective anolyte and catholyte flows, and controllably passed to the cathode compartment and the anode compartment respectively; and a system for conducting unidirectional electric current supported by the electrolytes from the anode structure through the separator structure and into the catholyte and to the cathode structure;

wherein, the separator structure incorporates at least one ion conductive membrane positioned to contactly separate the anode compartment and the at least one additional compartment, and arranged to preferentially conduct a plurality of Hydrogen Cations while impeding transport of at least one selection of Anions, and at least another ion conductive membrane positioned to contactly separate the cathode compartment and the at least one additional compartment, and arranged to preferentially conduct at least another selection of Anions while impeding transport of the plurality of Hydrogen Cations;

(b) providing an amount of raw materials and performing leaching to extract a leachate in a form of a pregnant leach solution;

(c) performing refining of the pregnant leach solution to extract desired metals and generate a raffinate;

(d) inputting an Acid Rock Drainage into the cathode compartment and the raffinate into the at least one additional compartment and conduct an unidirectional electric current from the anode structure to the cathode structure;

(e) redirecting an elevated acidity output from the at least one additional compartment onto the amount of raw material until predetermined quantities of the desired metals have been extracted.

13. The method of claim 12, wherein in the step (d) the input into the cathode compartment represent a mixture of the Acid Rock Drainage and the raffinate.

14. The method of claim 12, wherein the cathode structure comprises conducting cathode particulates forming a cathode particulates bed and a current feeder device in an least intermittent contact with said cathode particulates where the cathode particulates are arranged in motion and the particulates motion is substantially independent of a bulk flow of the catholyte.

15. The method of claim 12, wherein the anode structure comprises conducting anode particulates forming an anode particulates bed and a current feeder device in at least intermittent contact with said anode particulates where the anode particulates are arranged in motion and the particulates motion is substantially independent of a hulk flow of the anolyte.

16. The method of claim 12, wherein the at least one ion conductive membrane positioned to contactly separate the anode compartment and the at least one additional compartment incorporates a selective ion conductive membrane.

17. The method of claim 16, wherein the at least one ion conductive membrane positioned to contactly separate the anode compartment and the at least one additional compartment incorporates a proton selective Cation conductive membrane.

18. The method of claim 12, wherein the at least another ion conductive membrane positioned to contactly separate the cathode compartment and the at least one additional compartment incorporates a selective ion conductive membrane.

19. The method of claim 18, wherein the at least another ion conductive membrane positioned to contactly separate the cathode compartment and the at least one additional compartment incorporates a sulfate selective Anion conductive membrane.

20. The method of claim 12, the liquid electrolyte catholyte comprise Cations selected from the group consisting of $Al^{+3}$, $NH_4^+$, $Ba^{+2}$, $Cd^{+2}$, $Ca^{+2}$, $Cr^{+2}$, $Cr^{+3}$, $Co^{+2}$, $Cu^+$, $Cu^{+2}$, $H^+$, $H_3O^{+2}$, $Fe^{+2}$, $Fe^{+3}$, $Pb^{+2}$, $Pb^{+4}$, $Li^+$, $Mg^{+2}$, $Mn^{+2}$, $Hg_2^{+2}$, $Hg^{+2}$, $K^+$, $Ag^+$, $SR^{+2}$, $Na^+$, $Sn^{+2}$, $Sn^{+4}$, $Zn^{+2}$, and mixtures thereof.

21. The method of claim 12, wherein the liquid electrolyte anolyte comprise Anions seieted from the group consisting of $C_2H_3O_2^-/CH_3COO^-$, $Br^-$, $CO_3^{-2}$, $HCO_3^-$, $ClO_3^-$, $Cl^-$, $CrO_4^{-2}$, $CN^-$, $Cr_2O^{-2}$, $F^-$, $H^-$, $OH^-$, $ClO^-$, $IO_3^-$, $I^-$, $NO_3^-$, $N^{-3}$, $NO_2^-$, $C_2O_4^{-2}$, $O^{-2}$, $HC_2O_4^-$, $O_2^{-2}$, $PO_4^{-3}$, $HPO_4^{-2}$, $H_2PO_4^-$, $SiO_3^{-2}$, $SO_4^{-2}$, $HSO_4^-$, $S_2O_3^{-2}$, $S^{-2}$, $HS^-$, $SO_3^{-2}$, $HSO_3^-$, and mixtures thereof.

* * * * *